Feb. 2, 1954

J. H. KIRBY II 2,668,077

MAGNETIC FISHING TOOL

Filed July 30, 1952

John H. Kirby II
INVENTOR.

BY Murray Robinson

ATTORNEY

Feb. 2, 1954 — J. H. KIRBY II — 2,668,077
MAGNETIC FISHING TOOL
Filed July 30, 1952 — 2 Sheets-Sheet 2

John H. Kirby II
INVENTOR.

BY Murray Robinson
ATTORNEY

Patented Feb. 2, 1954

2,668,077

UNITED STATES PATENT OFFICE 2,668,077

MAGNETIC FISHING TOOL

John H. Kirby II, Houston, Tex.

Application July 30, 1952, Serial No. 301,682

30 Claims. (Cl. 294—65.5)

This invention pertains to tools for removing undesired materials from a well and more particularly to a magnetic tool for fishing magnetic junk out of a hole in the earth drilled by the rotary method, from which hole oil or gas is to be produced.

This application is a continuation-in-part of my prior application Serial Number 239,901, filed August 2, 1951, entitled "Well Tool."

It is the principal object of the invention to provide a magnetic fishing tool which will be more efficient in the removal of junk.

A more specific object of the invention is to provide a magnetic fishing tool in which the distribution of the magnetic field is controlled so as to make it more effective for holding magnetic junk.

A further object of the invention is to provide a magnetic fishing tool having fluid circulation means for clearing mud and detritus away from the magnetic junk wherein the fluid path is so positioned as to have a more effective field of action.

Still another object of the invention is to provide a magnetic fishing tool having a rotary shoe for clearing heavy and consolidated materials away from the magnetic junk wherein the shoe is positioned so its field of mechanical action cooperates more effectively with the magnetic and fluid-dynamic fields.

Another object of the invention is to provide a magnetic fishing tool which is more rugged and durable and better protected against accidental damage.

A further object of the invention is to provide a magnetic fishing tool which will more firmly hold the magnetic junk or fish.

Another object of the invention is to provide a magnetic fishing tool capable of holding a larger number of separate fish.

Still another object of the invention is to provide a magnetic fishing tool which will more nearly assure a one hundred percent removal of all the junk.

Another object of the invention is to provide a magnetic fishing tool that is more easily manufactured and repaired and maintained.

Other objects and advantages of the invention will appear from the following description of two preferred embodiments of the invention.

Reference will be made to the accompanying drawings wherein.

Figure 1:
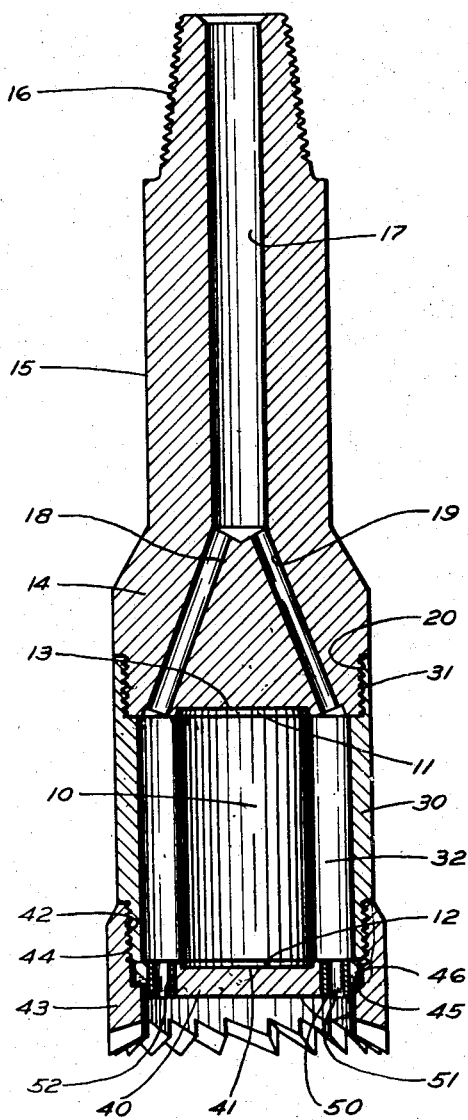
Figure 1 is a vertical section through one form of magnetic fishing tool embodying the invention.

Referring to Figure 1 there is shown a magnetic fishing tool including, as a core, a permanent bipolar bar magnet 10 having opposite poles at its upper and lower ends. The magnet has the shape of an elongated cylindrical rod and is tapered or beveled slightly at its ends as shown at 11, 12. The magnet is made of one of the modern ferromagnetic alloys having a high retentivity and field strength. A suitable magnetic material may consist of a combination of cobalt, aluminum, nickel and iron. Such magnets may also include platinum as one of the alloyed materials and are known as platinum magnets.

The upper beveled end 11 of the magnet is received in a correlative recess 13 in a cylindrical head 14. The head is provided with a cylindrical fishing neck 15 and has a screw thread 16 on its upper end adapted to engage a fluid conduit such as a drill pipe, drill collar, or tubing string. The head has a central fluid passage 17 in its upper portion communicating with a plurality of circumferentially spaced apart downwardly diverging fluid passages, two of which are shown at 18 and 19. The lower end of the head is provided with a screw thread 20. The head is made of high permeability ferromagnetic material of low retentivity.

A cylindrical tube or sleeve 30 has an internal thread 31 engaged with the thread 20 on the lower end of the head. Tube or sleeve 30 is made of high permeability low retentivity ferromagnetic material and in conjunction with the head which bridges over between and connects the upper ends of the sleeve and magnet conducts the flux from the upper pole of the magnet down to the level of the lower pole of the magnet where there is induced an annular pole disposed around and concentric with the pole at the lower end of the magnet and of opposite polarity. It is thus apparent that the magnet or core, head, and the sleeve 30 form a magnetic path and that a part of said path is a permanent magnet. It is further apparent that there is a magnetic pole at the lower end of the magnet or core and an opposite polarity magnetic pole at the portion of sleeve 30 which is disposed adjacent to the lower end of the core, said opposite polarity magnetic pole being disposed around said core pole.

The cross-sectional area of tube or sleeve 30 is preferably at least equal to that of magnet core 10. Inasmuch as tube or sleeve 30 also forms a housing surrounding and protecting magnet 10, the sleeve is preferably made of tough steel. The inner diameter of the sleeve is greater than the outer diameter of the magnet leaving an annular space 32 therebetween.

Space 32 provides a region free of ferromagnetic material to prevent short-circuiting of the magnet so as to insure maximum field intensity at the bottom of the magnet or core and the bottom of the housing or sleeve which is disposed around the magnet. Space 32 also serves as a fluid passage and the lower ends of the fluid passages in the head open into space 32.

A disc-shaped pole plate 40 has a recess 41 in its upper face corresponding to and receiving the lower end of the magnet. Plate 40 extends from the lower end of the magnet or core 10 into contact with tube or sleeve 30. Sleeve 30 also has a screw thread 42 on its lower end and a rotary shoe 43 has an internal thread 44 which engages thread 42. The rotary shoe is thus attached to the sleeve and extends downwardly from the lower end of the sleeve. An internal shoulder 45 on the rotary shoe engages a correlative shoulder 46 on the pole plate whereby, on tightening the rotary shoe, the whole assembly is firmly held together. Of course, while the pole plate is shown as being held in the manner just described it is apparent that it could be maintained in contact with sleeve 30 by any suitable means.

Tube or sleeve 30 and rotary shoe 43 may be considered together as being a shell of magnetic material which is disposed around and is spaced from the centrally positioned magnet or core 10. As thus described, it is apparent that a portion of the shell is disposed adjacent to the lower end of the core and, of course, in the embodiment shown in Fig. 1 the lower end of sleeve 30 is disposed adjacent to the lower end of the core and part of the rotary shoe itself is also disposed adjacent to the lower end of the core. The core, head, and shell form a magnetic path, there being a magnetic pole at the lower end of the core and an opposite polarity magnetic pole at the portion of the shell which is disposed adjacent to the lower end of the core. Of course, the opposite polarity magnetic pole is disposed around the core pole.

The rotary shoe may have any desired axial extent and number of teeth and may be of helical shape such as that shown on page 740 of the 1951 edition of the Composite Catalogue of Oil Field and Pipe Line Equipment. The shoe chosen should be adapted to the particular type and disposition of junk being fished for. If the junk is flat on the bottom of the hole, a plain ring having no teeth and coplanar with the pole plate bottom face would be suitable. Where there are a number of drill bit cones to be recovered, a toothed shoe as shown would be suitable. A helical shoe would be useful in recovering junk standing on end and leaning against one side of the hole.

Pole plate 40 is a composite member including a central area of disc-shape adjacent the lower end of the magnet core and formed of tough ferromagnetic material such as mild steel. The pole plate also includes an outer ring of magnetic material, the magnetic material being similar to that of the central area. Between the central area and the outer or peripheral area is a ring 50 of brass or other non-ferromagnetic material. Ring 50 constitutes an extension of the non-ferromagnetic region of space 32. It is thus apparent that the central plate area, core, head, sleeve, and peripheral plate area form a magnetic path. It is further apparent that there is a magnetic pole at the central plate area and an opposite polarity magnetic pole at the peripheral plate area disposed around the central plate area pole. A plurality of circumferentially spaced fluid passages, such as shown at 51 and 52, extend through the brass ring 50 and communicate with space 32. It may be added that viewed broadly the central magnetic area of the pole plate forms an extension of the core and when the term "core" is used in the claims hereof without reference to the pole plate it is to be understood that the term "core" may include such an extension.

The pole plate partially bridges the gap between the lower ends of the magnet and housing so as to reduce the reluctance of the magnetic circuit and help maintain the magnetism of the permanent magnet. The gap is sufficient however to cause the field to be distributed over the inner and lower surfaces of the rotary shoe and its teeth. Due to the concentric disposition of the magnetic circuit, the flux lines are radial and hence more concentrated near the center of the tool. Small pieces of junk will therefore be drawn to the center pole and will not bridge over the gap. Large pieces will bridge only part of the gap in a particular sector of the radial field. Therefore, the contacting of even several bit cones and many bearings will not completely short circuit the magnet which will still hold additional junk on contact therewith. It may be noted that although the magnet exerts a strong attraction for junk not in contact with it when brought into proximity therewith, by far the greatest attractive force occurs upon contact with the magnet or other junk already in contact therewith and maximum force is exerted on large pieces bridging the gap.

The disposition of the fluid passages around the center pole at the lower end of the magnet and the center part of the pole plate to which all of the junk is drawn by the radial field insures that the junk or fish is cleared of mud and detritus when it is in the position where it is most readily picked up by the magnetic field. The circumferential disposition of the fluid passages around the central pole insures that the passages will not be blocked by the first junk contacted.

The pole plate not only serves to control the strength and disposition of the magnetic field but also to protect the magnet against damage during fishing operations, magnets of this type often being somewhat brittle. The three sections of the pole plate should be either cast or soldered together to insure maximum strength.

After the tool has been assembled the magnetization of the magnet may be accomplished by placing the whole tool in a strong unidirectional field. On removal of the tool from the field the flux reverses in the housing. By magnetizing the magnet in this manner while assembled in the tool, a much greater field strength is obtained than if the magnet is separately energized and then assembled in the tool. The magnetic circuit of the fishing tool comprising the bar magnet together with the highly permeable low retentivity housing lends itself to magnetization by the method just described.

Figure 2:
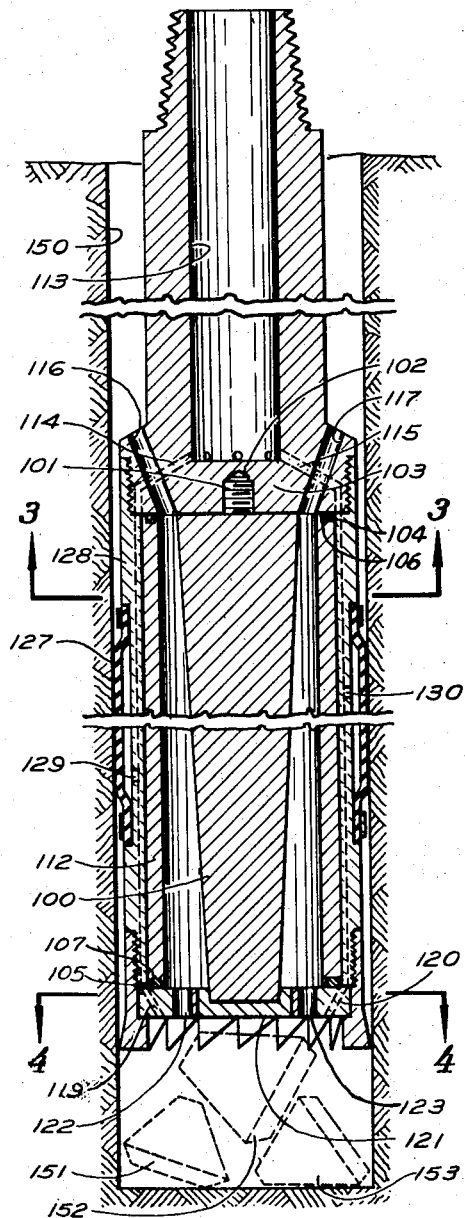
Figure 2 is a vertical section through another form of magnetic fishing tool embodying the invention.

Referring now to Figure 2 there is shown a tool generally similar to that shown in Figure 1. Only the points of difference need be described. The magnet 100 is a frustum of a cone providing a larger cross section at the upper end than at the lower end. This increases the non-ferromagnetic gap between the magnetic material sleeve 128 and magnet or core 100 at the lower active ends thereof insuring maximum flux density at the lower active ends thereof. At the same time the gap is reduced at the upper ends of the sleeve and magnet where it makes no difference if the flux jumps over at positions removed from the upper ends and it is desirable to have as low a reluctance path as possible. Also, the larger volume of permanent magnet material at the upper end provides a maximum magnetizing force in the circuit.

The upper end of the magnet is provided with a threaded stud 101 engaging a threaded hole 102 in head 103.

Figure 3:
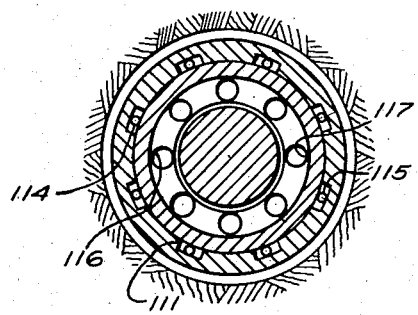
Figure 3 is a horizontal section taken on the line 3—3 of Figure 2.
Figure 4:
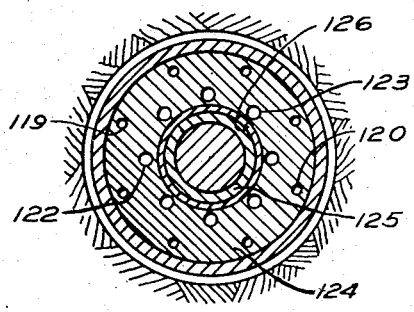
Figure 4 is a horizontal section taken on the line 4—4 of Figure 2.

The inner surface of the sleeve 128 is provided with a plurality of axially extending, circumferentially spaced channels of grooves such as 111 (see also Figure 3) which form part of the non-ferromagnetic region between the magnet and sleeve. A ring or sleeve 112 of brass or other non-ferromagnetic material is telescoped within the sleeve 128 in contact with the inner surface thereof. The ring has a larger inner diameter than the outer diameter of the magnet. The ring or non-magnetic material sleeve 112 thus divides the non-ferromagnetic region between the magnet and the magnetic material sleeve 128 into an inner annular passage adjacent the magnet and a plurality of outer passages formed by the non-magnetic material sleeve and the channels in the magnetic material sleeve. The outer passages are in communication with passage 113 in the fishing neck by means of the plurality of downwardly diverging circumferentially spaced fluid passages such as 114, 115. The inner passage is in communication with the exterior of the tool through a plurality of upwardly diverging fluid passages such as 116, 117.

The lower ends of the outer passage are in communication with the bottom face of the tool through a plurality of downwardly converging circumferentially spaced fluid passages such as 119, 120 through the pole plate 121. The inner passage is in communication with the lower face of the tool through a plurality of circumferentially spaced fluid passages such as 122, 123 through the pole plate which are staggered relative to passages 119, 120. The passages 119, 120 and 122, 123 are entirely within the outer ferromagnetic ring 124 of the pole plate which is separated from the central ferromagnetic area 125 by a ring 126 of brass or other non-ferromagnetic material.

Seal rings 104, 105 disposed in channels 106, 107 in the upper and lower ends of sleeve 112, seal between the upper and lower ends of the sleeve and the head 103 and pole plate 121 respectively. The seal rings prevent leakage across the lower face of the head from passages 114, 115 to passages 116, 117, and across the upper face of the pole plate which would by-pass passages 119, 120 and 122, 123.

A packer comprising an expansible sleeve 127 surrounds the sleeve 128 and is sealed thereto at its upper and lower edges. A plurality of passages such as 129, 130 extend through the sleeve 128 between the interior of the packer and the channels inside the sleeve.

The tool of Figure 2 is thus arranged for reverse circulation. Fluid from the drill string passes down through the passages formed between the channels in the magnetic material sleeve and the brass sleeve and then sweeps inwardly across the pole plate and back up around the central portion of the pole plate and the permanent magnet and thence out of the tool into the annulus between the drill string and the walls of the well 150. Fluid pressure is transmitted to the interior of the packer sleeve and expands it against the well wall to prevent normal circulation. The radially inward direction of the fluid across the pole plate adds to the magnetic force acting in the same direction so as to facilitate the movement of junk metal such as bit cones 151, 152 and 153, toward the lower end of the magnet.

It will be apparent that some of the advantages of the invention could be obtained by making the magnetic material sleeve of highly retentive material and the central bar of low retentive material. Also, the head and pole plate might be made of highly retentive material. Also, both the magnetic material sleeve and central bar could be made of highly retentive material. However, the previously described arrangement is much to be preferred because it facilitates the magnetization of the tool and enables the magnetic material sleeve, head, and pole plate to be made of tough shock and wear resisting material.

While preferred embodiments of the invention have been shown and described, it is obvious that many modifications thereof can be made by one skilled in the art without departing from the spirit of the invention and it is intended to protect by Letters Patent all forms of the invention falling within the scope of the following claims.

I claim:

1. A magnetic fishing tool comprising an elongated core of magnetic material having an upper end and a lower end, a tubular shell of magnetic material disposed around said core and spaced therefrom to provide a space between said shell and core, said shell having an upper end and a portion of said shell being disposed adjacent to the lower end of said core, a head of magnetic material connecting said core and said shell at the upper ends thereof, said core, head and shell forming a portion of a magnetic path and a part of said path portion being a permanent magnet, there being a magnetic pole at the lower end of said core and an opposite polarity magnetic pole at the portion of said shell disposed adjacent to the lower end of said core, said opposite polarity magnetic pole being disposed around said core pole, means to admit fluid to said space between said shell and core, means to conduct lengthwise of said space fluid so admitted, and means to discharge from said space fluid so conducted.

2. A magnetic fishing tool comprising an elongated permanent magnet core having an upper end and a lower end, a tubular shell of magnetic material disposed around said core and spaced therefrom to provide a space between said shell and core, said shell having an upper end and a portion of said shell being disposed adjacent to the lower end of said core, a head of magnetic material connecting said core and said shell at the upper ends thereof, said core, head, and shell forming a portion of a magnetic path, there being a magnetic pole at the lower end of said core and an opposite polarity magnetic pole at the portion of said shell disposed adjacent to the lower end of said core, said opposite polarity magnetic pole being disposed around said core pole, means to admit fluid to said space between said shell and core, said fluid-admitting means opening into said space above the level of the lower end of said core, and means to discharge downwardly from said space and between said opposite polarity poles fluid so admitted.

3. A magnetic fishing tool comprising an elongated cylindrical permanent magnet core having an upper end and a lower end, a cylindrical shell of magnetic material disposed around said core and spaced therefrom in concentric relation thereto to provide an annular space between said shell and core, said shell having an upper end and a portion of said shell being disposed adjacent to the lower end of said core, a head of magnetic material connecting said core and said shell at the upper ends thereof, said core, head, and shell forming a portion of a magnetic path, there being a magnetic pole at the lower end of said core and an opposite polarity magnetic pole at the portion of said shell disposed adjacent to the lower end of said core, said opposite polarity magnetic pole being disposed around said core pole to provide radial magnetic flux lines of increasing density progressing inwardly toward said core pole to urge junk contacted by said tool inwardly toward said core pole, means to admit fluid to said annular space between said shell and core, and means to discharge downwardly from said annular space fluid so admitted, said fluid discharge means surrounding said core pole to discharge fluid against junk tending to bridge said opposite polarity poles and therefore assist in having junk concentrate on said core pole.

4. A magnetic fishing tool comprising an elongated permanent magnet core having an upper end and a lower end, a tubular sleeve of magnetic material disposed around said core and spaced therefrom to provide a space between said sleeve and core, said sleeve having an upper end and a lower end, the lower end of said sleeve being located adjacent to the lower end of said core, a head of magnetic material connecting said core and said sleeve at the upper ends thereof, a plate contacting the lower end of said core and extending from the lower end of said core into contact with said sleeve, said plate including a central area of magnetic material contacting the lower end of said core and a peripheral area of magnetic material contacting said sleeve, said central plate area, core, head, sleeve, and peripheral plate area forming a portion of a magnetic path, there being a magnetic pole at said central plate area and an opposite polarity magnetic pole at said peripheral plate area disposed around said central area pole, means to admit fluid to said space between said sleeve and core, and means to discharge from said space fluid so admitted.

5. A magnetic fishing tool comprising an elongated cylindrical permanent magnet core having an upper end and a lower end, a cylindrical sleeve of magnetic material disposed around said core and spaced therefrom in concentric relation thereto to provide an annular space between said sleeve and core, said sleeve having an upper end disposed adjacent to the upper end of said core and a lower end disposed adjacent to the lower end of said core, a head of magnetic material connecting said core and said sleeve at the upper ends thereof, a plate connecting the lower ends of said core and said sleeve, said plate including a central area of magnetic material contacting the lower end of said core and an outer peripheral area of magnetic material contacting said sleeve, there being a ring of non-magnetic material disposed between and separating said central plate area and said peripheral plate area, said central plate area, core, head, sleeve, and peripheral plate area forming a portion of a magnetic path, there being a magnetic pole at said central plate area and an opposite polarity magnetic pole at said peripheral plate area disposed around said central area pole to provide radial magnetic flux lines of increasing density progressing inwardly toward said central area pole, a plurality of fluid passages through said plate circumferentially disposed around the lower end of said core, the upper ends of said passages opening into said annular space between the lower end of said core and said sleeve, and means to admit fluid to said annular space between said sleeve and core.

6. A magnetic fishing tool comprising an elongated permanent magnet core having an upper end and a lower end, a tubular sleeve of magnetic material disposed around said core and spaced therefrom to provide a space between said sleeve and core, said sleeve having an upper end and a lower end, a head of magnetic material connecting said core and said sleeve at the upper ends thereof, a shoe attached to said sleeve and extendng downwardly from the lower end of said sleeve, said core, head, sleeve and shoe forming a portion of a magnetic path, there being a magnetic pole at the lower end of said core and an opposite polarity magnetic pole at said shoe disposed around said core pole, means to admit fluid to said space between said sleeve and core, said fluid-admitting means opening into said space above the level of the lower end of said core, and means to discharge downwardly from said space fluid so admitted, said fluid discharge means being surrounded by said shoe and being located adjacent to said shoe.

7. A magnetic fishing tool comprising an elongated permanent magnet core having an upper end and a lower end, a tubular shell of magnetic material disposed around said core and spaced therefrom to provide a space between said shell and core, said shell including a tubular sleeve having an upper end and a lower end and a shoe attached to said sleeve and extending downwardly from the lower end of said sleeve, a portion of said shell being disposed adjacent to the lower end of said core, a head of magnetic material connecting said core and said shell at the upper end of said core and at the upper end of said sleeve forming a part of said shell, a plate including a central area of magnetic material contacting the lower end of said core and a peripheral area of magnetic material contacting the portion of said shell which is disposed adjacent to the lower end of said core, said central plate area, core, head, shell and peripheral plate area forming a portion of a magnetic path, there being a magnetic pole at said central plate area and an opposite polarity magnetic pole at said peripheral plate area disposed around said central area pole, means to admit fluid to said space between said shell and core, said fluid admitting means opening into said space above the level of the lower end of said core, and means to discharge downwardly from said space fluid so admitted.

8. A magnetic fishing tool comprising an elongated cylindrical permanent magnet core having an upper end and a lower end, a cylindrical shell of magnetic material disposed around said core and spaced therefrom in concentric relation thereto to provide a space between said shell and core, said shell including a cylindrical sleeve having an upper end and a lower end and a shoe attached to said sleeve and extending downwardly from the lower end of said sleeve, the lower end of said sleeve being disposed adjacent to the lower end of said core, a head of magnetic material connecting said core and said shell at the upper end of said core and at the upper end of said sleeve forming a part of said shell, a plate connecting the lower ends of said core and said sleeve, said plate including a central area of magnetic material contacting the lower end of said core and an outer peripheral area of magnetic material contacting said sleeve, there being a ring of non-magnetic material disposed between and separating said central plate area and said peripheral plate area, said central plate area, core, head, sleeve, and peripheral plate area forming a portion of a magnetic path, there being a magnetic pole at said central plate area and an opposite polarity magnetic pole at said peripheral plate area disposed around said central area pole to provide radial magnetic flux lines of increasing density progressing inwardly toward said central area pole, a plurality of fluid passages through said plate circumferentially disposed around the lower end of said core, the upper ends of said passages opening into the space between the lower end of said core and said shell, and means to admit fluid to said space between said shell and core.

9. A magnetic fishing tool comprising an elongated permanent magnet core having an upper end and a lower end, a tubular sleeve of non-magnetic material disposed around said core, a tubular sleeve of magnetic material disposed around said sleeve of non-magnetic material, said magnetic material sleeve having an upper end and a portion of said magnetic material sleeve being disposed adjacent to the lower end of said core, a head of magnetic material connecting said core and said magnetic material sleeve at the upper ends thereof, said core, head, and magnetic material sleeve forming a portion of a magnetic path, there being a magnetic pole at the lower end of said core and an opposite polarity magnetic pole at the portion of said magnetic material sleeve disposed adjacent to the lower end of said core, said opposite polarity magnetic pole being disposed around said core pole, a fluid passage located between said magnetic material sleeve and said non-magnetic material sleeve and extending lengthwise thereof, said fluid passage having an upper end and a lower end, means to connect the upper end of said fluid passage to a source of fluid, and means to discharge fluid from the lower end of said passage adjacent the level of the lower end of said core.

10. A magnetic fishing tool comprising an elongated permanent magnet core having an upper end and a lower end, a tubular sleeve of non-magnetic material disposed around said core, a tubular sleeve of magnetic material disposed around said sleeve of non-magnetic material, said magnetic material sleeve having an upper end and a portion of said magnetic material sleeve being disposed adjacent to the lower end of said core, a head of magnetic material connecting said core and said magnetic material sleeve at the upper ends thereof, said core, head, and magnetic material sleeve forming a portion of a magnetic path, there being a magnetic pole at the lower end of said core and an opposite polarity magnetic pole at the portion of said magnetic material sleeve disposed adjacent to the lower end of said core, said opposite polarity magnetic pole being disposed around said core pole, a fluid passage located between said non-magnetic material sleeve and said core and extending lengthwise thereof, said fluid passage having an upper end and a lower end, means to admit fluid to said passage at the lower end thereof, and means to discharge fluid from said passage at the upper end thereof.

11. A magnetic fishing tool comprising an elongated permanent magnet core having an upper end and a lower end, a tubular sleeve of non-magnetic material disposed around said core, a tubular sleeve of magnetic material disposed around said non-magnetic material sleeve, said magnetic material sleeve having an upper end and a lower end, said lower end being disposed adjacent the lower end of said core, a head of magnetic material connecting said core and said magnetic material sleeve at the upper ends thereof, a plate connecting the lower ends of said core and said magnetic material sleeve, said plate including a central area of magnetic material contacting the lower end of said core and an outer peripheral area of magnetic material contacting said magnetic material sleeve, there being a ring of non-magnetic material disposed between and separating said central plate area and said peripheral plate area, said central plate area, core, head, magnetic material sleeve, and peripheral plate area forming a portion of a magnetic path, there being a magnetic pole at said central plate area and an opposite polarity magnetic pole at said peripheral plate area disposed around said central area pole, a fluid passage located between said magnetic material and non-magnetic material sleeves and extending lengthwise thereof, said passage having an upper end and a lower end, means to conduct fluid through said head to the upper end of said fluid passage, and means to discharge fluid from the lower end of said passage adjacent the level of the lower end of said core.

12. A magnetic fishing tool comprising an elongated permanent magnet core having an upper end and a lower end, a tubular sleeve of non-magnetic material disposed around said core, a tubular sleeve of magnetic material disposed around said non-magnetic material sleeve, said magnetic material sleeve having an upper end and a lower end, said lower end being disposed adjacent the lower end of said core, a shoe attached to said magnetic material sleeve and extending downwardly from the lower end of said sleeve, a head of magnetic material connecting said core and said magnetic material sleeve at the upper ends thereof, a plate connecting the lower ends of said core and said magnetic material sleeve, said plate including a central area of magnetic material contacting the lower end of said core and an outer peripheral area of magnetic material contacting said magnetic material sleeve, there being a ring of non-magnetic material disposed between and separating said central plate area and said peripheral plate area, said central plate area, core, head, magnetic material sleeve, and peripheral plate area forming a portion of a magnetic path, there being a magnetic pole at said central plate area and an opposite polarity magnetic pole at said peripheral plate area disposed around said central area pole, a fluid passage located between said magnetic material and non-magnetic material sleeves and extending lengthwise thereof, said passage having an upper end and a lower end, means to conduct fluid through said head to the upper end of said fluid passage, and means to discharge fluid from the lower end of said passage adjacent the level of the lower end of said core.

13. A magnetic fishing tool according to claim 11 including a fluid passage between said core and said non-magnetic material sleeve, means to conduct fluid discharged from the lower end of the first said passage to the lower end of the last passage, and means to discharge fluid from the upper end of the last said passage to the exterior of the tool.

14. A magnetic fishing tool according to claim 11 in which said fluid discharge means includes a group of passages through said peripheral plate area annularly disposed around said core.

15. A magnetic fishing tool according to claim 14 including a second group of fluid passages through said plate annularly disposed around said core and disposed radially inwardly from the first said group of passages, a fluid passage between said core and said non-magnetic material sleeve in communication at its lower end with said second group of passages, and means at the upper end of the last passage to place it in communication with the exterior of the tool.

16. A magnetic fishing tool comprising an elongated permanent magnet core having an upper end and a lower end, a tubular sleeve of magnetic material disposed around said core, a tubular sleeve of nonmagnetic material disposed between and separating said core and said sleeve of magnetic material, said sleeve of magnetic material having an upper end disposed adjacent the upper end of said core and a lower end disposed adjacent to the lower end of said core, a bridge of magnetic material extending over the top of said non-magnetic material sleeve and connecting said core and said magnetic material sleeve at the upper ends thereof, said core, bridge, and magnetic material sleeve forming a portion of a magnetic path, there being a magnetic pole at the lower end of said core and an opposite polarity magnetic pole at the portion of said magnetic material sleeve disposed adjacent to the lower end of said core, said opposite polarity magnetic pole being disposed around said core pole, means to connect said tool to a source of fluid, means to discharge fluid from said tool near the level of the lower end of said core, and means forming an annular passage outside said core and said non-magnetic shell and including said magnetic material sleeve as a wall thereof to conduct fluid from the first said means to the last said means.

17. A magnetic fishing tool comprising an elongated permanent magnet core having an upper end and a lower end, a tubular sleeve of non-magnetic material disposed around said core, a tubular sleeve of magnetic material disposed around said sleeve of non-magnetic material, said magnetic material sleeve being disposed adjacent to the lower end of said core, a head of magnetic material connecting said core and said magnetic material sleeve at the upper ends thereof, said core, head and magnetic material sleeve forming a portion of a magnetic path, there being a magnetic pole at the lower end of said core and an opposite polarity magnetic pole at the portion of said magnetic material sleeve disposed adjacent to the lower end of said core, said opposite polarity magnetic pole being disposed around said core pole, a fluid passage located between said magnetic material sleeve and said non-magnetic material sleeve and extending lengthwise thereof, means to connect the upper end of said fluid passage to a source of fluid, means to discharge fluid from said passage adjacent the level of the lower end of said core, a second fluid passage located between said non-magnetic material sleeve and said core and extending lengthwise thereof, said second fluid passage having an upper end and a lower end, means to admit fluid to said second passage at the lower end thereof, and means to discharge fluid from said second passage at the upper end thereof.

18. A magnetic fishing tool comprising an elongated permanent magnet core having an upper end and a lower end, a tubular sleeve of non-magnetic material disposed around said core, a tubular sleeve of magnetic material disposed around said sleeve of non-magnetic material, said magnetic material sleeve being disposed adjacent to the lower end of said core, a head of magnetic material connecting said core and said magnetic material sleeve at the upper ends thereof, said core, head and magnetic material sleeve forming a portion of a magnetic path, there being a magnetic pole at the lower end of said core and an opposite polarity magnetic pole at the portion of said magnetic material sleeve disposed adjacent to the lower end of said core, said opposite polarity magnetic pole being disposed around said core pole, a fluid passage located between said magnetic material sleeve and said non-magnetic material sleeve and extending lengthwise thereof, means to connect the upper end of said fluid passage to a source of fluid, means to discharge fluid from said passage adjacent the level of the lower end of said core, a second fluid passage located between said non-magnetic material sleeve and said core and extending lengthwise thereof, said second fluid passage having an upper end and a lower end, means to admit fluid to said second passage at the lower end thereof, means to discharge fluid from said second passage at the upper end thereof, and an expansible sleeve surrounding said magnetic material sleeve, said expansible sleeve having upper and lower edges and being sealed to said magnetic material sleeve at said upper and lower edges, and means extending through said magnetic material sleeve to admit fluid under pressure to the interior of said sleeve to expand said sleeve against the inside of a well in which said tool is placed to prevent flow of fluid outside the tool lengthwise past said expansible sleeve.

19. A magnetic fishing tool comprising an elongated permanent magnet core having an upper end and a lower end, a tubular sleeve of non-magnetic material disposed around said core, a tubular sleeve of magnetic material disposed around said sleeve of non-magnetic material, the inside diameter of the magnetic material sleeve being equal to the outside diameter of the non-magnetic material sleeve whereby the said sleeves are in engagement one within the other, said magnetic material sleeve having an upper end and a portion of said magnetic material sleeve being disposed adjacent to the lower end of said core, a head of magnetic material connecting said core and said magnetic material sleeve at the upper ends thereof, said core, head and magnetic material sleeve forming a portion of a magnetic path, there being a magnetic pole at the lower end of said core and an opposite polarity magnetic pole at the portion of said magnetic material sleeve disposed adjacent to the lower end of said core, said opposite polarity magnetic pole being disposed around said core pole, a plurality of fluid passages located between said magnetic material sleeve and said non-magnetic material sleeve formed by grooves in one of said sleeves and extending lengthwise thereof, each of said fluid passages having an upper end and a lower end, another fluid passage located between said non-magnetic material sleeve and said core and extending lengthwise thereof, said other fluid passage also having an upper end and a lower end, means to connect said head to a fluid-conducting pipe, means to conduct fluid through said head to the upper ends of the fluid passages located between said magnetic material and non-magnetic material sleeves, means to discharge fluid from the lower ends of the passages between said magnetic material and non-magnetic material sleeves toward the lower end of the passage between said non-magnetic material sleeve and said core, and means to discharge fluid from the upper end of said last named passage to the exterior of said tool.

20. A magnetic fishing tool comprising an elongated permanent magnet core having an upper end and a lower end, a tubular sleeve of magnetic material disposed around said core and spaced therefrom, said sleeve having an upper end and a lower end, the lower end of said sleeve being located adjacent to the lower end of said core, the cross-sectional area of said core in a plane substantially at right-angles to the longitudinal axis of said core being substantially uniform throughout the length of said core, the cross-sectional area of said sleeve in a plane substantially at right-angles to the longitudinal axis of said sleeve being substantially uniform throughout the length of said sleeve and being substantially equal to said cross-sectional area of said core, a head of magnetic material connecting said core and said sleeve at the upper ends thereof, means including a connector rising from the upper end of said head for connecting said fishing tool to means for raising or lowering the tool in a well, and means to provide protection for the core against damage by mechanical shock when the tool strikes a hard object such as a piece of junk in a well bottom, said protecting means including a plate of tough material covering the lower end of said permanent magnet core, non-magnetic means disposed adjacent the lower end of said core and magnetically separating said sleeve from said core, and means supporting the outer edge of said plate from the lower end of said sleeve, said protecting means bridging the lower end of said space between said sleeve and core, said plate having at least a central portion of magnetic material in contact with the lower end of said core and forming an extension thereof, said core, head and sleeve forming a portion of a magnetic path, there being a magnetic pole at the lower end of said core and an opposite polarity magnetic pole at the lower end of said sleeve located adjacent to the lower end of said core, said opposite polarity magnetic pole being disposed around said core pole.

21. A magnetic fishing tool comprising an elongated cylindrical permanent magnet core having an upper end and a lower end, a cylindrical sleeve of magnetic material disposed around said core and spaced therefrom in concentric relation thereto to provide an annular space between said sleeve and core, said sleeve having an upper end disposed adjacent to the upper end of said core and a lower end disposed adjacent to the lower end of said core, a head of magnetic material connecting said core and said sleeve at the upper ends thereof, means including a connector rising from the upper end of said head for connecting said fishing tool to means for raising or lowering the tool in a well, and means to provide protection for the core against damage by mechanical shock when the tool strikes a hard object such as a piece of junk in the well bottom, said protecting means bridging the lower end of said space between said sleeve and core and covering the lower end of said core, said protecting means including a disc of tough magnetic material in contact with the lower end of said core and forming an extension thereof, an annular ring of non-magnetic material disposed around said disc and supporting said disc at the outer periphery thereof, and means supporting the outer edge of said ring from the lower end of said sleeve, said core, head and sleeve forming a portion of a magnetic path, there being a magnetic pole at the lower end of said core and an opposite polarity pole at the lower end of said sleeve surrounding said core pole to provide radial magnetic flux lines of increasing density progressing inwardly toward said core pole, said annular ring of non-magnetic material being located between said opposite polarity magnetic poles and separating the lower end of said core and the lower end of said sleeve.

22. A magnetic fishing tool comprising an elongated cylindrical permanent magnet core having an upper end and a lower end, a cylindrical sleeve of magnetic material disposed around said core and spaced therefrom in concentric relation thereto to provide an annular space between said sleeve and core, said sleeve having an upper end disposed adjacent to the upper end of said core and a lower end disposed adjacent to the lower end of said core, a head of magnetic material connecting said core and said sleeve at the upper ends thereof, said core, head and sleeve forming a portion of a magnetic path, there being a magnetic pole at the lower end of said core and an opposite polarity magnetic pole at the lower end of said sleeve disposed adjacent to the lower end of said core, said opposite polarity magnetic pole being disposed around said core pole to provide radial magnetic flux lines of increasing density progressing inwardly toward said core pole to urge junk contacted by said tool inwardly toward said core pole, means to admit fluid to said space between said sleeve and core, and a plurality of fluid-discharge ports surrounding said core pole, said fluid-discharge ports being located between the lower end of said core and the lower end of said sleeve to discharge fluid from said ports against junk tending to bridge said opposite polarity poles and therefore assist in having junk concentrate on said core pole.

23. A magnetic fishing tool comprising an elongated cylindrical permanent magnet core having an upper end and a lower end, a cylindrical sleeve of magnetic material disposed around said core and spaced therefrom in concentric relation thereto to provide an annular space between said core and sleeve, said sleeve having an upper end disposed adjacent to the upper end of said core and a lower end disposed adjacent to the lower end of said core, a head of magnetic material connecting said core and said sleeve at the upper ends thereof, a plate connecting the lower ends of said core and said sleeve, said plate including a central area of magnetic material contacting the lower end of said core, and an outer peripheral area of magnetic material contacting said sleeve, said central area projecting radially beyond the lower end of said core and said peripheral area projecting radially inwardly of the lower end of said sleeve, there being a ring of non-magnetic material disposed between and separating said central plate area and said peripheral plate area, said central plate area, core, head, sleeve and peripheral plate area forming a portion of a magnetic path, there being a magnetic pole at said central plate area and an opposite polarity magnetic pole at said peripheral plate area disposed around said central area pole to provide radial magnetic flux lines of increasing density progressing inwardly toward said central area pole to urge junk contacted by said tool inwardly toward said central area pole, and a plurality of passages through said plate circumferentially disposed around the lower end of said core, the upper ends of said passages opening into the space between the lower end of said core and said sleeve.

24. A magnetic fishing tool comprising a single elongated cylindrical permanent magnet core having an upper end and a lower end, a cylindrical sleeve of magnetic material disposed around said core and spaced therefrom in concentric relation thereto to provide an annular space between said sleeve and core, said space between said core and said sleeve being devoid of magnetic material, said sleeve having an upper end disposed adjacent to the upper end of said core and a lower end disposed adjacent to the lower end of said core, a head of magnetic material connecting said core and said sleeve at the upper ends thereof, a plate of tough material covering the lower end of said permanent magnet core to provide protection for the core against mechanical injury, said plate bridging the lower end of said space between said sleeve and core, means supporting the outer edge of said plate from the lower end of said sleeve, said plate having a central portion of magnetic material in contact with the lower end of said core forming an extension thereof, said core, head and sleeve forming a portion of a magnetic path, there being a magnetic pole at the lower end of said core and an opposite magnetic pole at the lower end of said sleeve surrounding said core pole to provide radial magnetic flux lines of increasing density progressing inwardly toward said core pole, said plate including an annular ring of non-magnetic material located between said opposite polarity magnetic poles and separating the lower end of said core and the lower end of said sleeve, said head having a recess in its lower side correlative to and receiving the upper end of said permanent magnet core, said plate having a recess in its upper side correlative to and receiving the lower end of said permanent magnet core, said core being held centrally in said sleeve by said head and plate.

25. A magnetic fishing tool comprising an elongated permanent magnet core having an upper end and a lower end, a tubular shell of magnetic material disposed around said core and spaced therefrom to provide a space between said shell and core, said shell having an upper end and a portion of said shell being disposed adjacent to the lower end of said core, a head of magnetic material connecting said core and shell at the upper ends thereof, said core, head, and shell forming a portion of a magnetic path, there being a magnetic pole at the lower end of said core and an opposite polarity magnetic pole at the portion of said shell disposed adjacent to the lower end of said core, said opposite polarity magnetic pole being disposed around said core pole, a pipe connected to the upper side of said head, means on said pipe to connect it to a fluid conduit, a plurality of fluid passages through said head connecting the interior of said pipe with the upper end of said space between said shell and core, said passages being disposed around the axis of said tool, said pipe and passages and said space between said shell and core providing means to conduct downwardly fluid admitted from a fluid conduit connected to said pipe and to discharge downwardly from said space between said opposite polarity poles fluid so admitted.

26. A magnetic fishing tool comprising an elongated permanent magnet core having an upper end and a lower end, a tubular shell of magnetic material disposed around said core and spaced therefrom to provide a space between said shell and core, said shell having an upper end and a portion of said shell being disposed adjacent to the lower end of said core, a head of magnetic material connecting said core and said shell at the upper ends thereof, means to provide protection for the core against mechanical injury, said protecting means including a plate of tough material covering the lower end of said permanent magnet core, non-magnetic means disposed adjacent the lower end of said core and magnetically separating said shell from said core, and means supporting the outer edge of said plate from the lower end of said shell, said protecting means bridging the lower end of said space between said shell and core, said plate having at least a central portion of magnetic material in contact with the lower end of said core forming an extension thereof, said core, head, and shell forming a portion of a magnetic path, there being a magnetic pole at the lower end of said core and an opposite polarity magnetic pole at the portion of said shell disposed adjacent to the lower end of said core, said opposite polarity pole being disposed around said core pole, a pipe connected to the upper side of said head, means on said pipe for connecting it to a fluid conduit, a plurality of passages through said head connecting the interior of said pipe with the upper end of said space between said core and said shell, said passages being disposed around the axis of said tool, a plurality of ports through said plate connecting the lower end of said space with the exterior of said tool at the lower end thereof, said pipe and passages providing means to admit fluid to the upper end of said space from a conduit connected to said pipe, said ports providing nozzle means to jet discharge downwardly from said space and between said opposite polarity poles fluid so admitted, and said space formed between said core and shell providing a fluid channel to conduct fluid down through said tool from said pipe and passages to said ports.

27. A magnetic fishing tool comprising an elongated permanent magnet core having an upper end and a lower end, a tubular shell of magnetic material disposed around said core and spaced therefrom to provide a space between said shell and core, said shell having an upper end and a portion of said shell being disposed adjacent to the lower end of said core, a head of magnetic material connecting said core and said shell at the upper ends thereof, a plate of tough material covering the lower end of said permanent magnet core to provide protection for the core against mechanical injury, said plate bridging the lower end of said space between said shell and core, means supporting the outer edge of said plate from the lower end of said shell, said plate having a central portion of magnetic material in contact with the lower end of said core forming an extension thereof and an annular portion of non-magnetic material surrounding said central portion of magnetic material and separating said central portion from said shell, said core, head, and shell forming a portion of a magnetic path, there being a magnetic pole at the lower end of said core and an opposite polarity magnetic pole at the portion of said shell disposed adjacent to the lower end of said core, said opposite polarity pole being disposed around said core pole, a pipe connected to the upper side of said head, means on said pipe for connecting it to a fluid conduit, a plurality of passages through said head connecting the interior of said pipe with the upper end of said space between said core and said shell, said passages being disposed around the axis of said tool, a plurality of ports through said plate connecting the lower end of said space with the exterior of said tool at the lower end thereof, said pipe and passages providing means to admit fluid to the upper end of said space from a conduit connected to said pipe, said ports providing nozzle means to jet discharge downwardly from said space and between said opposite polarity poles fluid so admitted, and said space formed between said core and shell providing a fluid channel to conduct fluid down through said tool from said pipe and passages to said ports, said head having a recess in its lower side correlative to and receiving the upper end of said permanent magnet core, said plate having a recess in its upper side correlative to and receiving the lower end of said permanent magnet core, said core being held centrally in said tool between said head and plate, and said shell holding said head and plate together.

28. A magnetic fishing tool comprising an elongated permanent magnet core having an upper end and a lower end, a tubular sleeve of magnetic material disposed around said core and spaced therefrom to provide a space between said sleeve and core, said sleeve having an upper end and a portion of said sleeve being disposed adjacent to the lower end of said core, a head of magnetic material connecting said core and said sleeve at the upper ends thereof, a plate of tough material covering the lower end of said permanent magnet core to provide protection for the core against mechanical injury, said plate bridging the lower end of said space between said sleeve and core, a shoe having an annular upper end screwed to the lower end of said sleeve and having an inwardly extending shoulder extending beneath the outer edge of said plate, said plate having a central portion of magnetic material in contact with the lower end of said core forming an extension thereof and an annular portion of non-magnetic material surrounding said central portion of magnetic material and separating said central portion from said sleeve, said core, head, and sleeve forming a portion of a magnetic path, there being a magnetic pole at the lower end of said core and an opposite polarity magnetic pole at the portion of said sleeve disposed adjacent to the lower end of said core, said opposite polarity pole being disposed around said core pole, a pipe extending vertically upward from the upper part of said head and integral therewith, said pipe having a screw thread formed at its upper end for connecting it to a fluid conduit, a plurality of passages through said head connecting the interior of said pipe with the upper end of said space between said core and said sleeve, said passages terminating at their lower ends between said core and sleeve at different azimuthal positions around the axis of said core, a plurality of ports through said plate connecting the lower end of said space with the exterior of said tool at the lower end thereof, said pipe and passages providing means to admit fluid to the upper end of said space from a conduit connected to said pipe, said ports providing nozzle means to jet discharge downwardly from said space and between said opposite polarity poles fluid so admitted, and said space formed between said core and sleeve providing a fluid channel to conduct fluid down through said tool from said pipe and passages to said ports, said head having a recess in its lower side correlative to and receiving the upper end of said permanent magnet core, said plate having a recess in its upper side correlative to and receiving the lower end of said permanent magnet core, said core being held centrally in said tool between said head and plate, and said sleeve holding said head and plate together.

29. A magnetic fishing tool comprising a permanent magnet core having an upper end and a lower end, a sleeve of magnetic material disposed around said core and spaced therefrom, said sleeve having an upper end and a lower end, the lower end of said sleeve being located adjacent to the lower end of said core, a head of magnetic material connecting said core and sleeve at the upper ends thereof, said core, head and sleeve forming a portion of a magnetic path, there being a magnetic pole at the lower end of said core and an opposite polarity pole at the lower end of said sleeve surrounding said core pole to provide radial magnetic flux lines of increasing density progressing inwardly toward said core pole, means supporting said core extending between said core and sleeve, said supporting means providing support for said core adjacent the lower end of said core and including non-magnetic means magnetically separating said core and sleeve, and means to convey fluid through said tool to discharge said fluid downwardly at the lower end of said tool.

30. A magnetic fishing tool according to claim 29 wherein said sleeve has an exterior surface and said exterior surface is an exterior surface of said tool and wherein said means to convey fluid through said tool to discharge said fluid discharges said fluid at the lower face of said tool within an area bounded by the inner periphery of said sleeve.

JOHN H. KIRBY, II.

References Cited in the file of this patent
UNITED STATES PATENTS

| Number | Name | Date |
|---|---|---|
| 2,471,764 | Miller et al. | May 31, 1949 |
| 2,501,615 | Pugh | Mar. 21, 1950 |
| 2,522,294 | Noble | Sept. 12, 1950 |
| 2,556,849 | Nolley et al. | June 12, 1951 |
| 2,595,632 | Bivings et al. | May 6, 1952 |